(12) United States Patent
Hanna et al.

(10) Patent No.: US 8,843,319 B2
(45) Date of Patent: Sep. 23, 2014

(54) SYSTEMS AND METHODS FOR THE DETERMINATION OF FORMATION WATER RESISTIVITY AND CONDUCTIVITY

(75) Inventors: Ragheb R. Hanna, Cypress, TX (US);
Ted J. Griffin, Jr., Spring, TX (US);
Paul Roger Martin, Cypress, TX (US);
Robert Hanna Lee, Waller, TX (US);
John Dacy, Houston, TX (US)

(73) Assignee: Core Laboratories LP, Houston, TX (US)

( * ) Notice: Subject to any disclaimer, the term of this patent is extended or adjusted under 35 U.S.C. 154(b) by 350 days.

(21) Appl. No.: 13/273,980

(22) Filed: Oct. 14, 2011

(65) Prior Publication Data

US 2013/0096833 A1 Apr. 18, 2013

(51) Int. Cl.
*G01V 3/24* (2006.01)

(52) U.S. Cl.
CPC .................................... *G01V 3/24* (2013.01)
USPC ........... 702/11; 73/152.07; 324/658; 324/376

(58) Field of Classification Search
CPC ......... G06F 19/22; G06F 19/16; G06F 19/18; G06F 19/00; G01V 3/24
USPC ........ 702/19, 22, 11; 73/152.07, 38; 324/324, 324/325–377, 658; 166/250.01, 254.2
See application file for complete search history.

(56) References Cited

U.S. PATENT DOCUMENTS

| | | | |
|---|---|---|---|
| 3,515,988 A | 6/1970 | Shawhan | |
| 3,954,140 A * | 5/1976 | Hendrick | 166/50 |
| 4,015,195 A * | 3/1977 | Hoyer et al. | 324/323 |
| 4,107,598 A | 8/1978 | Meador et al. | |
| 4,233,839 A * | 11/1980 | Coates | 73/152.06 |
| 4,263,509 A * | 4/1981 | Fertl et al. | 250/255 |
| 4,774,471 A | 9/1988 | Sims et al. | |
| 4,780,679 A * | 10/1988 | Kenyon et al. | 324/338 |
| 5,233,522 A | 8/1993 | Sinclair | |
| 5,503,004 A * | 4/1996 | Agar | 73/61.44 |
| 5,811,973 A | 9/1998 | Meyer, Jr. | |
| 6,496,020 B1 | 12/2002 | Davey et al. | |
| 6,591,195 B2 | 7/2003 | Haugland | |
| 6,997,055 B2 * | 2/2006 | DiFoggio | 73/152.18 |
| 7,363,160 B2 * | 4/2008 | Seleznev et al. | 702/7 |
| 7,721,802 B2 * | 5/2010 | Levy | 166/250.03 |
| 7,940,050 B2 | 5/2011 | Bespalov et al. | |
| 8,174,266 B2 * | 5/2012 | Gold et al. | 324/355 |
| 2009/0125239 A1 * | 5/2009 | Niemeyer et al. | 702/11 |

FOREIGN PATENT DOCUMENTS

WO 2009084980 A1 7/2009

OTHER PUBLICATIONS

Vernier (Modified from an experiment by Vernier, Prepared for SMART Center Workshop, Jul. 1996, Conductivity Experiment).*
Rusiniak, 2000 (Spontaneous polarization of water in porous structure of a solid body).*

(Continued)

*Primary Examiner* — Sujoy Kundu
*Assistant Examiner* — Lisa Peters
(74) *Attorney, Agent, or Firm* — Fletcher Yoder PC

(57) ABSTRACT

According to various embodiments, a method may include measuring a first capacitance of a sample at a first frequency using a measurement system, measuring a second capacitance of the sample at a second frequency using the measurement system, calculating a ratio of the first capacitance to the second capacitance, and determining a formation water resistivity or conductivity of the sample using the ratio.

20 Claims, 5 Drawing Sheets

(56) References Cited

OTHER PUBLICATIONS

Wightman, Jalinoos, Sirles, and Hanna ("Application of Geophysical Methods to Highway Related Problems." Federal Highway Administration, Central Federal Lands Highway Division, Lakewood, CO, Publication No. FHWA-IF-04-021, Sep. 2003, Induced Polarization (IP) and Complex Resistivity).*

Fernandez, Goodwin and Sengers, 1995 (Measurements of the Relative Permittivity of Liquid Water at Frequencies in teh Range of 0.1 to 10kHz and at Temperatures Between 273.1 and 373.2 K at Ambient Pressure).*

R.C. Rumble, et al.; "Dielectric Constant of Rocks as a Petrophysical Parameter," SPWLA 17th Annual Logging Symposium, Socity of Petrophysicists & Well Log Analysts, 1976, 28 pgs.

Wang Weinan, et al.; "Experimental Investigation on the Dielectric Constant of Rocks with Low Porosity and Permeability," SPE Advance Technology Series, vol. 5, No. 1, SPE30871, 1997, pp. 115-119.

Ali a. Garrouch, et al.; "Dielectric Dispersion of Partially Saturated porous Media in the Frequency Range 10 Hz to 10 MHz," The Log Analyst, May-Jun. 1998, pp. 48-53.

International Search Report and Written Opinion for PCT Application No. PCT/US2012-060067 dated Sep. 2, 2013; 8 pgs.

* cited by examiner

SYSTEMS AND METHODS FOR THE DETERMINATION OF FORMATION WATER RESISTIVITY AND CONDUCTIVITY

BACKGROUND

The present disclosure relates generally to electrical property measurement and, more particularly, to determining the resistivity or conductivity of formation water in subsurface samples.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Petroleum, or crude oil, is a flammable liquid that includes a mixture of various compounds, such as hydrocarbons and other organic compounds, and occurs naturally in subsurface formations. Natural gas is a flammable gas that may found together with petroleum and other hydrocarbon fuels. Petroleum may have been formed by the exposure of ancient organic material that settled onto lake or sea bottoms to intense heat and/or pressure. Today, wells drilled into subsurface formations associated with these ancient bodies of water may be used to recover the petroleum. The underground pressure found in some formations may be sufficient to force the petroleum to the surface. In other formations, more expensive techniques, referred to as secondary and tertiary methods, may be used to bring the petroleum to the drilled shaft, or wellbore. The recovered petroleum from the wellbore may be separated via distillation into a variety of liquid and gaseous products, such as gasoline, kerosene, propane, natural gas, and asphalt, and chemical intermediates used in the manufacture of consumer products, such as plastics and pharmaceuticals. Unfortunately, global petroleum reserves have been declining as worldwide consumption of petroleum products continues to increase. In addition, the costs associated with petroleum recovery have increased as more secondary and tertiary methods are used to recover the dwindling supplies of petroleum. These rising costs are reflected in the increased cost of fuels and other consumer products.

In light of its limited future, producers have sought out alternatives to petroleum. One such alternative is oil shale, which is an organic-rich rock found in certain subsurface formations. Oil shale may have been formed from ancient organic deposits that were not exposed to enough heat and/or pressure to be transformed into petroleum. Thus, the hydrocarbon content of oil shale may be different from that of petroleum. However, oil shale may be recovered using methods similar to those used for petroleum recovery. For example, wells may be drilled into oil shale deposits and various techniques, such as hydraulic fracturing or other stimulation, may be used to recover the oil shale. In addition, shale gas, which is similar to natural gas, may be recovered from oil shale deposits. Oil shale and shale gas may be used successfully as fuels or chemical intermediates. Thus, the development of oil shale deposits may be expected to increase as worldwide supplies of petroleum and other hydrocarbons decrease, and current estimates of global oil shale deposits exceed those of petroleum.

Although hydrocarbon deposits may be found in many parts of the world, these deposits vary widely in their organic compound content and other characteristics. Thus, for commercial and economic reasons, producers may prefer to develop hydrocarbon deposits with relatively higher amounts of hydrocarbons. Surface-based methods, such as seismic studies that involve sending sound waves into the ground and analyzing their reflections, may be used to identify potential hydrocarbon deposits. Subsequently, drilling may be used to physically obtain samples from the subsurface formations. These samples, referred to as core samples or simply cores, may be sent to laboratories or other facilities located away from the wellsite for analysis. Various tests of the core samples may be conducted to estimate the content of organic material in the hydrocarbon deposit. For example, the hydrocarbons may be present in pore spaces of the subsurface formation. If present, the quantity or degree of hydrocarbon saturation is identified to help determine the commerciality of hydrocarbon production of the subsurface formation. Several methods for determining the hydrocarbon quantity exist. For example, the gas saturation Sg or the oil saturation So (expressed as percent of pore space) may be calculated using the following equation:

$$Sg (\text{or } So) = 100 - Sw \qquad \text{(EQUATION 1)}$$

where Sw is the water saturation (expressed as percent of pore space). Accordingly, the water saturation Sw may be calculated using the following equation:

$$Sw = (F \ast Rw/Rt)^{1/n} \qquad \text{(EQUATION 2)}$$

where F is a formation resistivity factor, Rw is a formation water resistivity, Rt is a true formation resistivity, and n is a water saturation exponent. Thus, values for all the variables in these equations are needed to solve for the gas saturation Sg or the oil saturation So in the pore space.

Water, which is referred to as formation water, is generally present within the pore spaces of subsurface formations, such as hydrocarbon deposits. The formation water resistivity Rw is dependent on the ionic composition of the water solution. The formation water resistivity Rw is further dependent on temperature, although a well-based transform may be used to enable translation from one temperature to another. As indicated by Equation 2 above, the formation water resistivity Rw is one of several variables needed to solve for the water saturation Sw. Rw may be determined by:

1. Calculation using resistivity and porosity logs.
2. Measurement of resistivity or salinity of water produced at the surface from subsurface formations.
3. Measurement of resistivity or salinity of water contained in cores of subsurface formations.

For example, in the second method above, formation water is collected and brought to the surface for analysis. This collected water is referred to as produced water. By using the produced water method, the formation water resistivity Rw may be directly identified. However, sample variability and availability may hinder this method. For example, sources of water other than the formation water contained in the pore spaces may contaminate the produced water, thereby altering the measured formation water resistivity Rw. Examples of other sources of water include water introduced during drilling, water migrating through fracture conduits within the earth, and water of condensation. In addition, many formations do not produce any water. Thus, other approaches may be used to determine the formation water resistivity Rw because of the uncertainty and possible unavailability inherent in produced water analysis.

The measurement of the resistivity of water contained in cores of subsurface formations may overcome some of the limitations of produced water analysis. For example, the cores may analyzed using direct displacement or distillation/leach techniques. In direct displacement, force is used to expel the pore water from the subsurface sample. For example, displacement may be achieved via high-speed centrifugation or by a high-pressure oil drive. Further, depending on the characteristics of the core, it may be crushed or ground into a powder to increase the amount of water expelled. The displaced water may then be directly measured for formation water resistivity Rw. Such displacement techniques may be influenced by the ability of the formation water to move through the subsurface sample, referred to as permeability, and the volume of formation water present in the sample. In addition, direct displacement techniques may take days to complete and are limited in their ability to expel formation water from the core.

Distillation/leach is an indirect technique to identify the formation water resistivity Rw of subsurface samples. In this technique, the formation water present in the sample is distilled, captured, and quantified, leaving behind precipitated salts in the dried core sample. The core sample is then contacted with a known distilled water volume and leached to extract the salts remaining in the dried pore spaces. Following leaching, the leach water is analyzed for ion content. The ion analysis and the volume of water distilled from the core sample are combined to determine the ion content (salinity) present in the pore spaces. The formation water resistivity Rw may then be calculated from the salinity of the pore water using established techniques. Unfortunately, distillation/leach tests may take days to complete and may be influenced by geochemical reactions that occur during the hydrolysis of minerals in the core sample. Additionally, cation exchange between the ions present in the leach water and any clays present in the core sample will influence the analyzed ion content. Thus, accurate results may require a geochemical model to help identify the salinity that was originally present in the pores of the core sample.

Thus, current techniques for determining formation water resistivity Rw possess several shortcomings. For example, certain tests may be destructive, involving crushing and/or grinding of the subsurface sample into smaller particles. Other tests may involve heating, applying liquids, or other preparatory steps. Thus, current tests may be costly, complicated, and/or time-consuming because of the preparation and steps associated with such testing and the need to ship the subsurface sample to facilities remote from the wellsite.

BRIEF DESCRIPTION OF THE DRAWINGS

Advantages of the disclosed techniques may become apparent upon reading the following detailed description and upon reference to the drawings in which.

DETAILED DESCRIPTION OF SPECIFIC EMBODIMENTS

Figure 1:
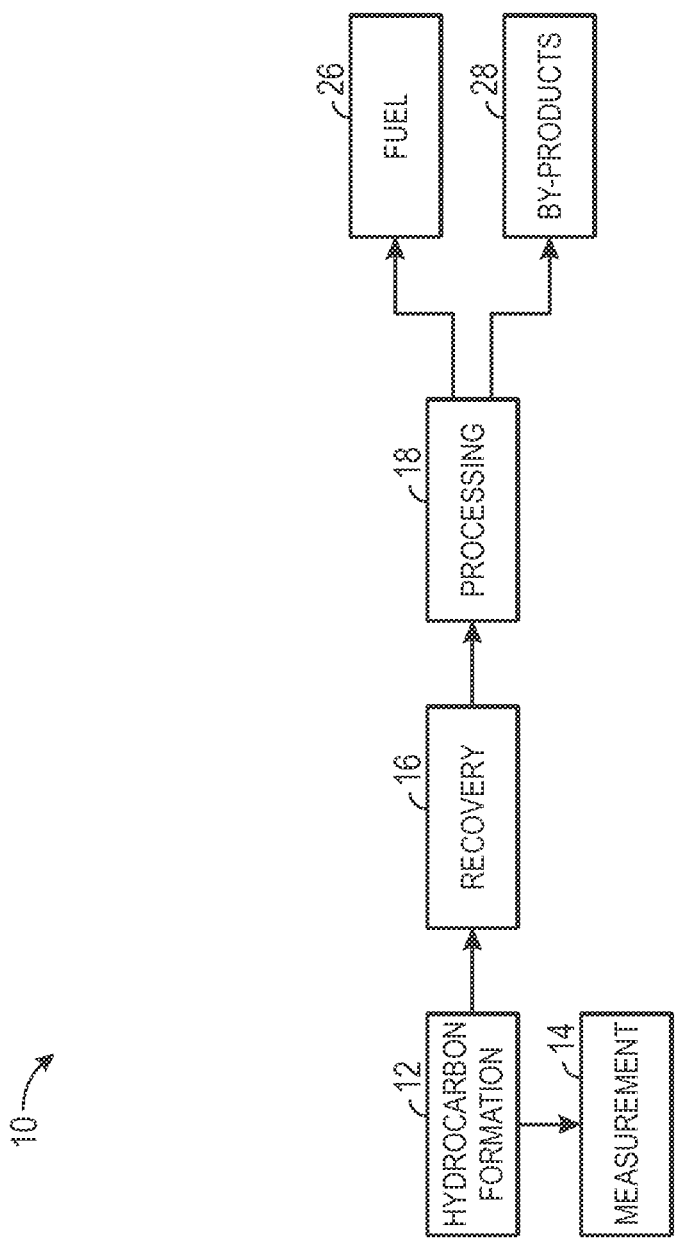
FIG. 1 is a block diagram of an embodiment of a hydrocarbon production system that includes core sampling.

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Techniques for determining a formation water resistivity ($R_w$) or conductivity of a subsurface sample without the use of destructive testing are disclosed herein. Subsurface samples include, but are not limited to, cores, core plugs, drill cuttings, powders, oil-water mixtures, emulsions, and so forth. The formation water resistivity was found to be empirically related to a salinity index (SI). The empirical relationship between the formation water resistivity and the salinity index was derived using multi-frequency complex resistivity measurements that were performed on rock samples partially to fully saturated with the formation water. For example, a series of salt water solutions (formation water) of various known salt concentrations (ppm) and water resistivities ($R_w$) may be prepared. Next, the pore volumes of a series of standard rock samples may be partially or fully filled with each of the known water solutions. Next, complex resistivity measurements may be performed on each formation water in the pore volumes of the rock samples. The complex resistivity measurements may be mathematically combined to yield a single term, namely the salinity index (SI), which can be correlated with the known resistivity ($R_w$) for that formation water. These correlations between formation water resistivity and salinity index have been found to be independent of the amount of water saturation in a rock, the rock porosity, the rock type, the clay content of the rock, and temperature. As a result, a salinity index (SI) can be determined from multi-frequency complex resistivity measurements of rock samples recovered either from the subsurface or in the subsurface that contain water of unknown resistivity and used with such correlations to predict the water resistivity ($R_w$) of the unknown formation water.

The relationship between the salinity index (SI), capacitance ($C_P$), and frequency (F) is shown below using the following equation:

$$SI = \frac{C_{p1}}{C_{pn}} \quad \text{(EQUATION 3)}$$

where the terms $C_{p1}$ and $C_{pn}$, are determined using the following equations:

$$C_{p1} = \frac{1}{(2\pi) \times \left\{ F_1 \times \left(1 + \frac{1}{Q_1^2}\right) \right\} \times (Z_1 \times \sin\theta_1)} \quad \text{(EQUATION 4)}$$

$$C_{pn} = \frac{1}{(2\pi) \times \left\{ F_n \times \left(1 + \frac{1}{Q_n^2}\right) \right\} \times (Z_n \times \sin\theta_n)} \quad \text{(EQUATION 5)}$$

where $C_{p1}$ is a capacitance measurement at a first frequency (farad), $C_{pn}$, is a capacitance measurement at an nth frequency (farad), $F_1$ is a first frequency (hertz), $Q_1$ is a quality number at the first frequency, $Z_1$ is an impedance at the first frequency (ohm), $\theta_1$ is a phase angle at the first frequency (radian), $F_n$ is an nth frequency (hertz), $Q_n$ is a quality number at the nth frequency, $Z_n$ is an impedance at the nth frequency, and $\theta_n$ is a phase angle at the nth frequency.

In one embodiment, the capacitance of the formation water in subsurface samples at two or more frequencies is measured. In certain embodiments, the capacitance measurements are performed using well logging tools or similar instruments. Next, determining a ratio of the measured capacitance values of the subsurface sample yields the salinity index, as described above. The resistivity or conductivity of the formation water contained in the subsurface sample may then be determined from the salinity index. In certain embodiments, an oral, digital, or physical report may be generated that includes the determined formation water resistivity or conductivity. These techniques for determining the formation water resistivity or conductivity of subsurface samples from capacitance ratios may be implemented in a variety of ways. For example, in one embodiment, one or more steps may be performed automatically and one or more steps may be performed manually. In another embodiment, all of the steps may be performed automatically, such as by a single stand-alone system. In yet another embodiment, measurement values may be transmitted to a computer, which is programmed with instructions for determining the formation water resistivity or conductivity of the subsurface sample. The formation water resistivity or conductivity may then be displayed on a monitor connected to the computer. For example, the capacitance data may be collected at a wellsite and transmitted to a vehicle or other facility where the computer determines the formation water resistivity or conductivity.

The techniques described in detail below may possess several advantages compared to previous methods for determining properties of subsurface samples. For example, in some embodiments, the formation water resistivity of subsurface samples is determined in a non-destructive manner. Specifically, the capacitance of the subsurface sample may be measured directly without any preparation of the sample. In other words, the subsurface sample is not crushed or ground into smaller particles, or exposed to chemicals or other liquids to measure the capacitance. The formation water resistivity or conductivity of either symmetrical or asymmetrical subsurface samples may be determined. In other words, the disclosed techniques may be used on subsurface samples with a variety of shapes and sizes. For example, the subsurface sample may be an irregularly shaped piece of rock or in the shape of a cylinder. Further, the disclosed techniques may be used to determine the formation water resistivity or conductivity of the subsurface sample directly and independently. For example, in certain embodiments, no other systems or methods are used to determine intermediate values or parameters that then are used by the disclosed techniques to determine the formation water resistivity or conductivity of the subsurface sample.

With the foregoing in mind, FIG. 1 is a block diagram of a hydrocarbon production process 10 in accordance with an embodiment. As illustrated, a hydrocarbon subsurface formation 12 is first identified using a variety of methods such as, but not limited to, geological surveys, core sampling, test wells, seismic studies, and so forth. For example, measurement 14 of the subsurface formation 12 using the techniques described in detail below may be conducted to identify the water and hydrocarbon composition of the subsurface formation 12. In addition, a variety of common drilling techniques may be used to obtain the subsurface sample from the subsurface formation 12. In certain embodiments, a formation water resistivity or conductivity of the subsurface sample may be determined, which may indicate the composition of the subsurface formation 12. Examples of subsurface formations 12 include, but are not limited to, sandstone formations, limestone formations, oil shale formations, gas shale formations, and so forth.

Resistivity may be defined as a measure of how strongly a material opposes the flow of electric current. A low resistivity may indicate a material that regularly allows the movement of electric charge. Conductivity is the reciprocal of resistivity and measures an ability of the material to conduct an electric current. Thus, in certain embodiments, either the formation water resistivity of the subsurface sample, the formation water conductivity of the subsurface sample, or both may be determined. In the following discussion, reference may be made only to determining formation water resistivity, however, it is understood that any disclosed technique, method, or embodiment for determining formation water resistivity is also capable of determining formation water conductivity. In certain embodiments, capacitance values of the subsurface sample at two or more frequencies are measured, which are then used to determine the formation water resistivity or conductivity of the subsurface sample, as described in detail below. Subsurface samples with higher resistivities may have higher amounts of hydrocarbons compared to deposits with lower resistivities because hydrocarbons are resistive compared to formation water, which is typically saline and conductive. Similarly, subsurface samples with lower conductivities may have higher amounts of hydrocarbons than deposits with higher conductivities.

Impedance is a measure of the overall opposition of a circuit to current. In other words, impedance indicates how much the circuit impedes the flow of current. Thus, impedance is similar to resistance, but also takes into account capacitance and inductance. Thus, in certain embodiments, impedance values of the subsurface sample at two or more frequencies may be used to determine the formation water resistivity or conductivity of the subsurface sample, as described in detail below.

In other embodiments, the resistivity or conductivity of the formation water in the subsurface formation 12 may be determined in-situ without the removal of a subsurface sample. For example, a borehole may be drilled into the subsurface formation 12 and the measurement 14 may involve lowering an instrument capable of taking multi-frequency capacitance (or impedance) measurements into the borehole. The instrument may be used to obtain capacitance measurements at two or more frequencies at each of several points along the length of the borehole. The data from the instrument may be transmitted to a vehicle or other facility near the borehole, or to a facility remote from the borehole. At the facility, the data may be analyzed to determine the formation water resistivity or conductivity values at the points along the length of the borehole. This information may then be used to determine the depths or locations where higher concentrations of hydrocarbons are located in the subsurface formation 12. Measurement 14 of the subsurface formation 12 may continue until one or more locations to begin hydrocarbon production have been identified.

After a subsurface formation 12 that can be economically produced is identified, recovery 16 of the hydrocarbons may be performed. For example, various drilling and recovery techniques may be used to bring the hydrocarbons to the surface. Once the hydrocarbons are recovered from the subsurface formation 12, the hydrocarbons may be processed in a processing system 18 to produce refined hydrocarbons suitable for use as a fuel 26 and/or byproducts 28. For example, the fuel 26 may be combusted to produce heat and energy in a variety of combustors, reactors, or engines. The byproducts 28 may be used as raw materials in a variety of chemical, pharmaceutical, and many other industries.

Figure 2:
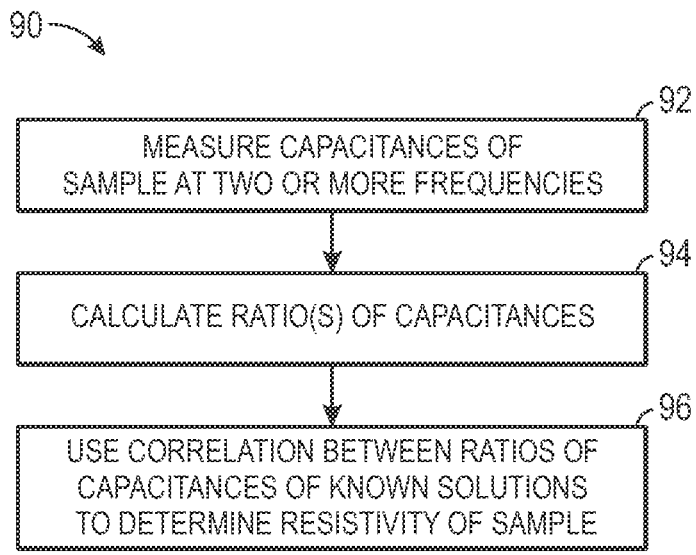
FIG. 2 is a work flow chart of a process for determining a formation water resistivity Rw of a subsurface sample in accordance with an embodiment of the present technique.

The techniques described below may be used during the hydrocarbon production process 10 of FIG. 1 to quickly and accurately determine the formation water resistivity or conductivity of subsurface samples from the subsurface formation 12. The use of such techniques may be expected to increase as worldwide petroleum reserves decrease and producers turn to petroleum alternatives, such as oil shale and shale gas. Specifically, FIG. 2 is a work flow chart of a process 90 for determining formation water resistivities or conductivities of subsurface samples. In a first step 92, the capacitances (or impedances) of the subsurface sample are measured at two or more frequencies. The function of the selected frequencies is to obtain a suitable correlation between measured capacitances and formation water resistivity values. For example, capacitance measurements at two or more frequencies may be obtained and then two or more frequencies utilized that provide a relationship between capacitance and formation water resistivity values. For example, a variety of frequencies may be obtained and then two frequencies selected that provide a suitable correlation or salinity index. In certain embodiments, a first frequency may be approximately 500 Hz and a second frequency may be approximately 1,000 Hz. In other embodiments, the first frequency may be approximately 5,000 Hz and the second frequency may be approximately 10,000 Hz. These examples of first and second frequencies are non-limiting examples and depending on the characteristics of particular subsurface samples, other pairs of frequencies may provide correlations that are more suitable. In addition, a ratio of the first frequency to the second frequency may be between approximately 0.1:1 to 0.9:1, 0.2:1 to 0.8:1, or 0.3:1 to 0.7:1. Again, such ranges of ratios of the first frequency to the second frequency are non-limiting examples and other ranges may be more suitable depending on the characteristics of the subsurface sample. In a second step 94, a ratio of the capacitances at the selected two or more frequencies may be determined. The ratio of the capacitances is a dimensionless number and may be referred to as the salinity index. In certain embodiments, the salinity indices may be between approximately 1.5 to 3, 1.7 to 2.5, or 1.9 to 2.2. A computer or other calculating system may determine the salinity index automatically or the salinity index may be determined manually. In a third step 96, a correlation between the salinity indices and the water resistivities of known solutions or samples may be used to determine the formation water resistivity of the subsurface sample. The correlation may exist as a table of values, a curve, or an equation. For example, as discussed in detail below, a chart or graph of salinity indices and water resistivities may be prepared automatically or manually. A best-fit curve may be drawn through the points displayed on the graph manually or plotted automatically. Knowing the salinity index of the subsurface sample, the best-fit curve may be used to determine the formation water resistivity of the subsurface sample.

Figure 3:
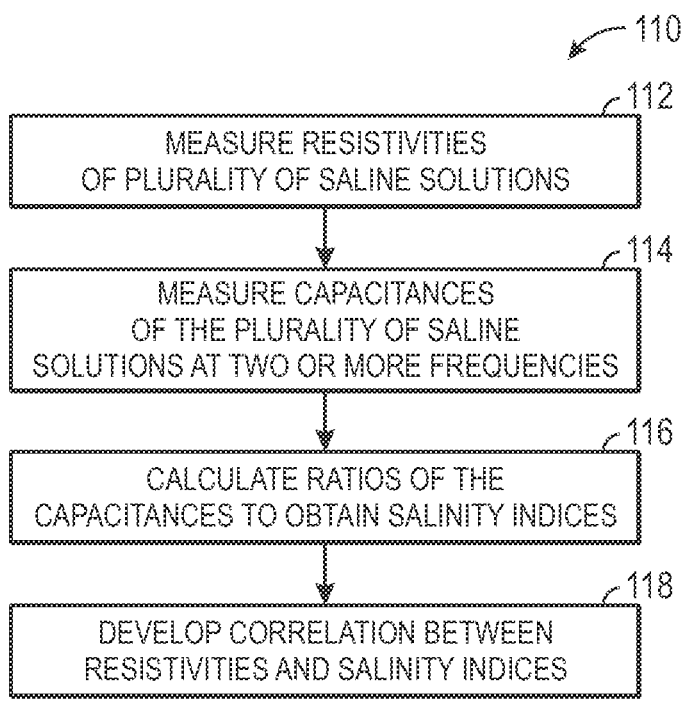
FIG. 3 is a work flow chart of a process for determining a formation water resistivity Rw from a salinity index in accordance with an embodiment of the present technique.

With the process 90 for determining formation water resistivities in mind, FIG. 3 is a flow chart of a process 110 for obtaining the correlation between the water resistivities and salinity indices. In a first step 112, the water resistivities of a plurality of saline or brine solutions are measured. The resistivity measurements may be performed using well logging tools or similar instruments. In certain embodiments, at least approximately 5, 10, 15, 20, or more known saline solutions of known resistivities may be used. Use of greater numbers of known saline solutions may provide a more detailed or smoother correlation. The known saline solutions may include a range of concentrations. For example, the range of concentrations of the known saline solutions may be between approximately 1,000 to 225,000 ppm sodium chloride (NaCl). In a second step 114, the capacitances of the plurality of known saline solutions are measured at two or more frequencies. For example, the capacitance of each of the plurality of known saline solutions may be measured at multiple frequencies. For example, the ratio of a first frequency to a second frequency may be between approximately 0.1:1 to 0.9:1, 0.2:1 to 0.8:1, or 0.3:1 to 0.7:1. In a third step 116, ratios of the capacitances are determined to obtain the salinity indices for each of the known saline solutions 54. The salinity indices may be determined automatically or manually.

Figure 4:
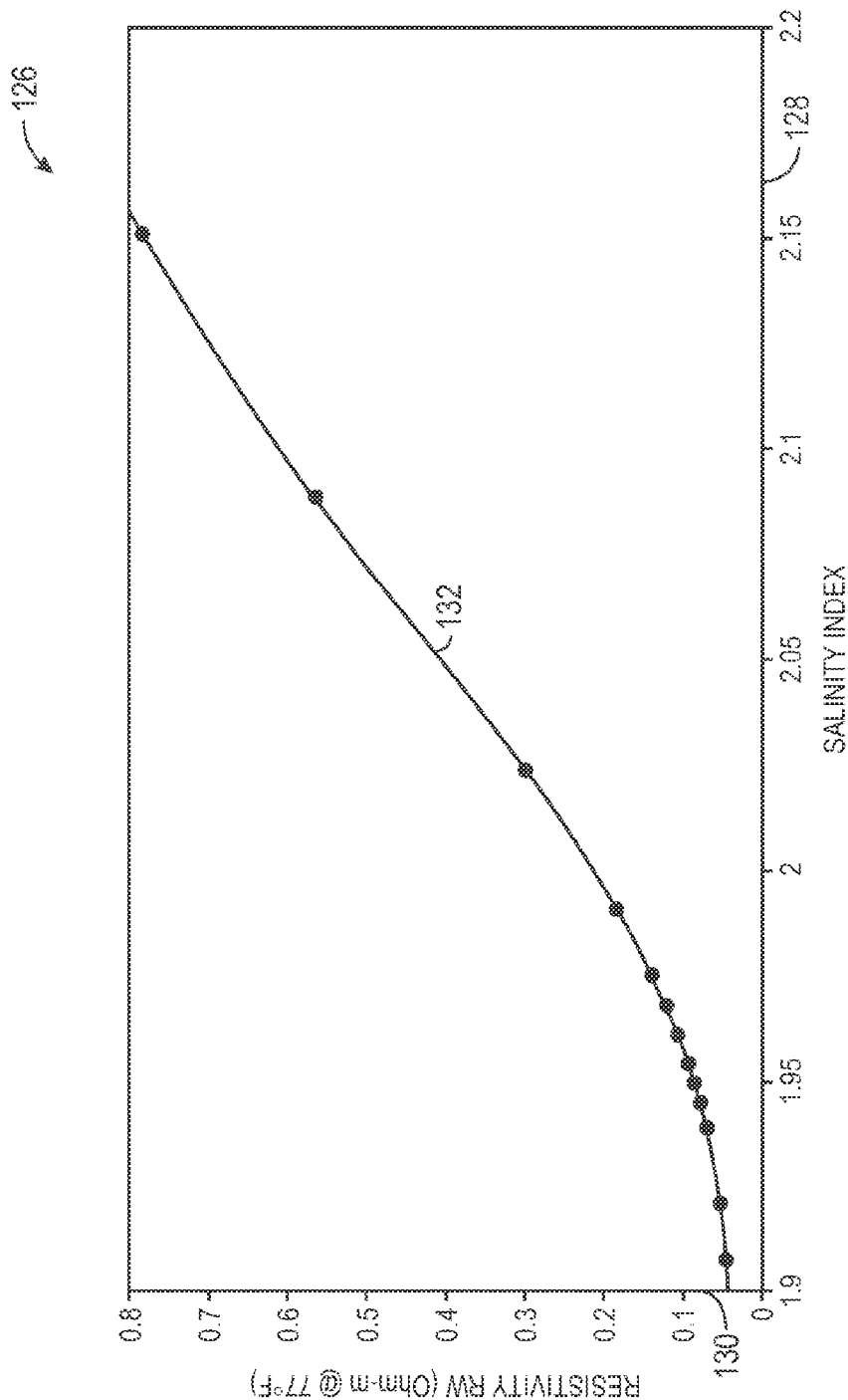
FIG. 4 is a graph of formation water resistivities Rw versus salinity indices obtained in accordance with an embodiment of the present technique.

In a fourth step 118 of the process 110, a correlation between the measured water resistivities and salinity indices of the known saline solutions is determined. For example, a graph of the water resistivities and salinity indices may be prepared and an example of such a graph 126 is shown in FIG. 4. As illustrated in FIG. 4, an x-axis 128 represents salinity indices and a y-axis 130 represents water resistivities. The measured water resistivity values may be plotted as a function of the calculated salinity indices and a best-fit curve 132 plotted through the points. The best-fit curve 132 may be drawn manually, or selected by a computer or other calculating system using regression analysis, for example. As shown in FIG. 4, the curve 132 shows a smooth, generally increasing relationship between water resistivity and salinity index. Specifically, water resistivity may be expected to increase as the salinity index increases. In other words, higher values of the salinity index may correspond to higher values of formation water resistivity. As resistivity is the reciprocal of conductivity, a graph of water conductivity would show a decreasing relationship with the salinity index. In other words, higher values of the salinity index may correspond to lower values of water conductivity. After plotting the curve 132, an equation may be determined to represent the curve 132 mathematically. For example, regression analysis may be used to obtain a polynomial equation corresponding to the curve 132. Thus, the equation may be used to determine the formation water resistivity of the subsurface sample directly without having to refer to the graph 126. In other words, knowing a value of the salinity index, the equation may be used to calculate the formation water resistivity. Alternatively, a table of values that includes water resistivities and salinity indices may be prepared using the curve 132. Knowing the salinity index, the table of values may be used to look up the corresponding water resistivity. The curve 132, equation, and/or table of values may be used to determine the formation water resistivity automatically or manually.

Figure 5:
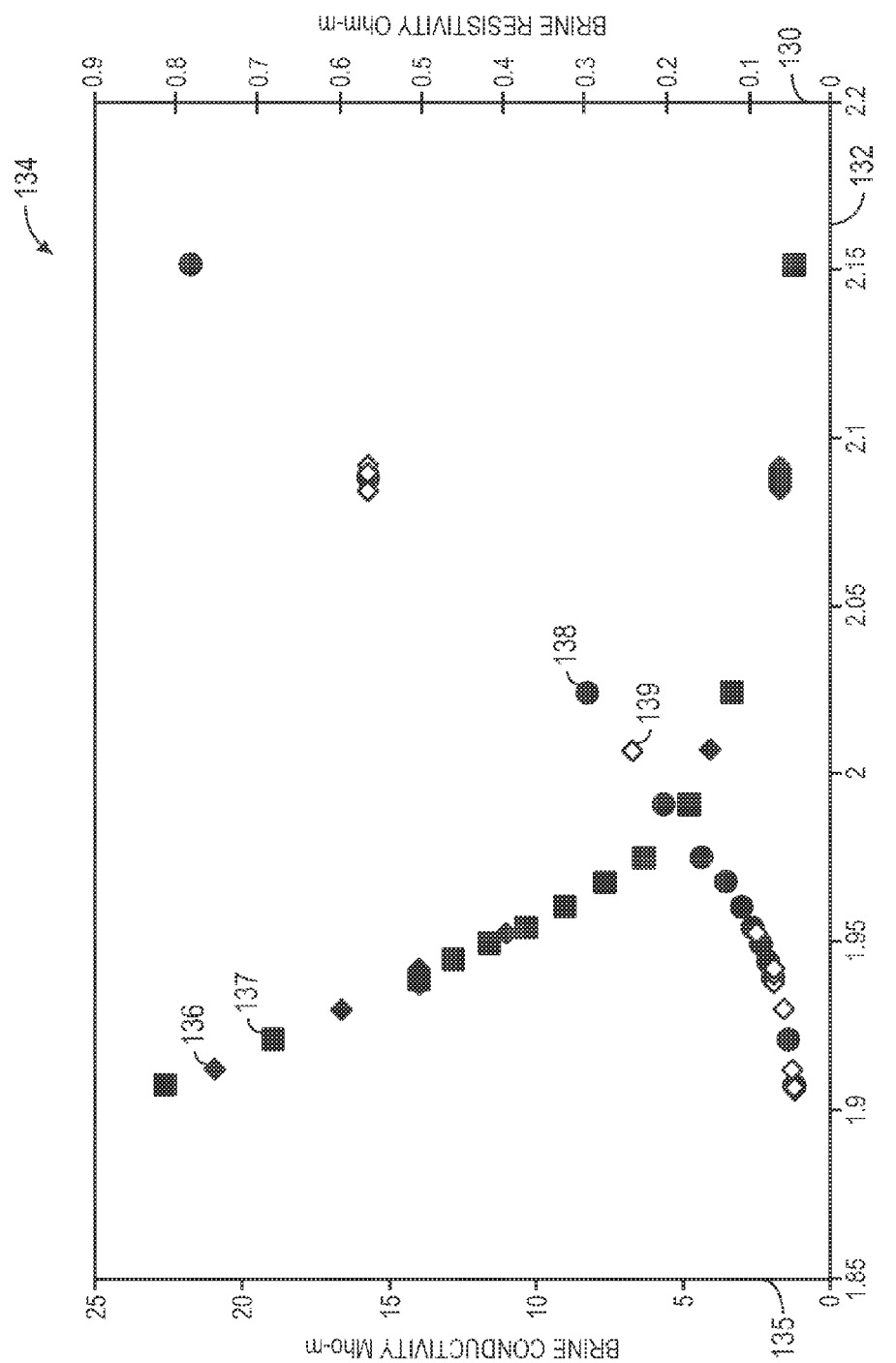
FIG. 5 is a graph of formation water resistivities Rw and conductivities versus salinity indices obtained in accordance with an embodiment of the present technique.

The method of determining the formation water resistivity of subsurface samples described above may be used for subsurface samples from a variety of subsurface formations 12. For example, FIG. 5 is a graph 134 illustrating water resistivity and conductivity values for several different subsurface samples. The x-axis 132 of the graph 134 represents the salinity index, the left y-axis 135 represents the water conductivity, and the right y-axis 130 represents the water resistivity. The water conductivity values of samples of a clay-free rock are shown plotted in FIG. 5 as points 136. The water conductivity values of samples of a clay-containing rock are plotted as points 137. As shown in FIG. 5, the points 136 and 137 generally overlap with one another. Thus, the correlation between the water conductivity and salinity index may be similar for subsurface samples with varying concentrations of clay. Similarly, the water resistivity values of samples of the clay-containing rock are shown as points 138 and the water resistivity values of samples of the clay-free rock are shown as points 139 in FIG. 5. As illustrated, the points 138 and 139 generally overlap with one another. Thus, the correlation between the water resistivity and salinity index may be similar for subsurface samples with varying concentrations of clay. In other words, the techniques disclosed herein may be appropriate for use with a wide variety of subsurface samples containing varying concentrations of clay.

Different systems may be used to perform the techniques for determining the formation water resistivity or conductivity of subsurface samples described above. For example, in one embodiment, certain steps of the disclosed techniques may be performed automatically and other steps performed manually. In another embodiment, a computer may determine and display the formation water resistivity of the subsurface sample based on transmitted measurement values. In the embodiment shown in FIG. 6, a laboratory-based formation water measurement system 40 performs the steps associated with the disclosed techniques automatically. The measurement system 40 may include a monitor 42, which may include a variety of circuits to determine the formation water resistivity of a subsurface sample 52. For example, a circuit of the monitor 42 may include instructions for measuring capacitances of the subsurface sample 52 at two or more frequencies, calculating ratios of the capacitances, and using a correlation to determine the formation water resistivity of the subsurface sample 52, corresponding to the steps of the process 90 described above. The measurement system 40 may also determine the formation water conductivity of the subsurface sample 52. In certain embodiments, the monitor 42 may include a display 44, which may be used to show the obtained formation water resistivity or conductivity of the subsurface sample 52. In addition, the display 44 may show other relevant information associated with the status of the monitor 42. The monitor 42 may also include one or more control inputs 46, which may be used by an operator to provide input to the monitor 42. For example, the operator may select an appropriate correlation depending on the characteristics of the subsurface sample 52. Further, the monitor 42 may include one or more connectors 48 and wires 50 connected to the connectors 48 to be used to measure the subsurface sample 52. The wires 50 may be made from a conductive material, such as metal, to transmit the measured capacitance of the subsurface sample 52 to the monitor 42. In certain embodiments, the wires 50 may be covered by a non-conductive material to electrically insulate and protect the wires 50 from potential damage or wear. In such embodiments, ends of the wires 50 may include electrically conductive tips or clips to attach to the subsurface sample 52. After connecting the wires 50 to the subsurface sample 52, the operator may start the formation water resistivity determining process 90 using the control inputs 46. The monitor 42 may then automatically perform the steps of the process 90 and then display the formation water resistivity of the subsurface sample 52 on the display 44. In addition, the monitor 42 may provide a physical report of the formation water resistivity information, either by itself or through a connected printer. The operator may then disconnect the wires 50 from the subsurface sample 52 to conduct testing of additional subsurface samples 52. In certain embodiments, the display 44, control inputs 46, and connectors 48 may be disposed on the monitor 42 and/or configured differently from that shown in FIG. 6.

In further embodiments, the measurement system 40 may optionally include one or more known samples 54, which may be used to set up and/or calibrate the measurement system 40. For example, the known samples 54 may be subsurface samples 52 or brine solutions of known formation water resistivity and/or capacitance. Thus, the measurement system 40 may use the known samples 54 to carry out the steps of the process 110 to develop the correlation between formation water resistivities and salinity indices described above. Specifically, the operator may use the monitor 52 to measure the capacitances of each of the known samples 54 by attaching the wires 50 to the samples 54 one at a time. The monitor 42 may then calculate the salinity indices of each of the known samples 54. With this information, the monitor 52 may then develop the correlation between formation water resistivities and salinity indices to be used during measurement of the subsurface sample 52. As the correlation may only be developed once, the measurement system 40 may include the known solutions 54 only when first setting up or initializing the measurement system 40. In other embodiments, the measurement system 40 may simply be programmed with the appropriate correlation based on carrying out the steps of the process 110 with other measurement systems 40 or in a laboratory environment. The measurement system 40 shown in FIG. 6 may be located in an offsite laboratory or testing facility.

Figure 6:
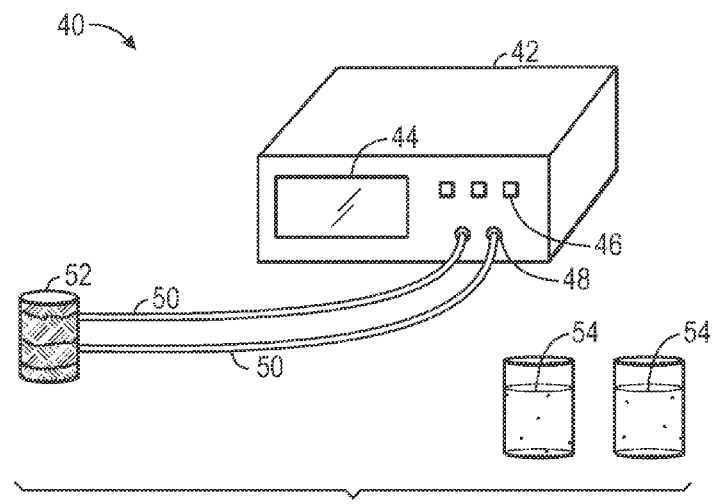
FIG. 6 is a perspective view of an embodiment of a laboratory-based formation water measurement system.
Figure 7:
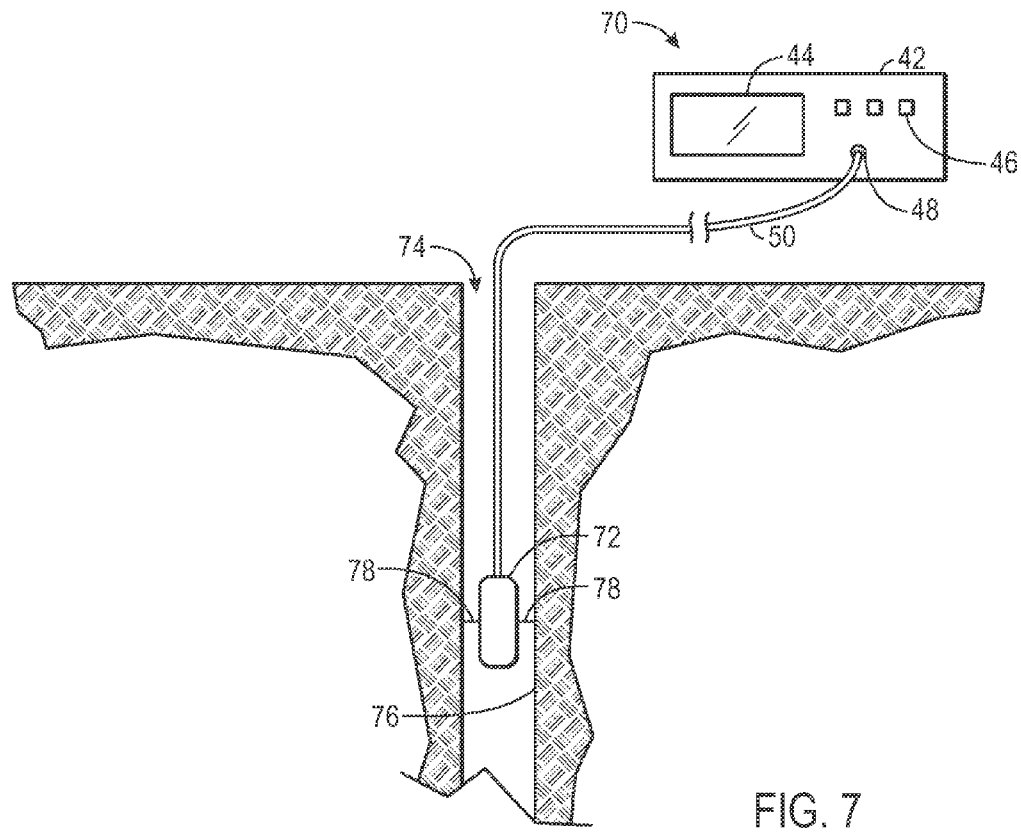
FIG. 7 is a schematic diagram of an embodiment of a wellsite measurement system.

In other embodiments, the formation water resistivity of the subsurface formation 12 may be determined at the wellsite. Specifically, FIG. 7 is a schematic diagram of a wellsite measurement system 70. Elements in common with those shown in FIG. 6 are labeled with the same reference numerals. Specifically, the wellsite measurement system 70 may include the monitor 42 programmed with instructions for determining formation water resistivity using a correlation between ratios of capacitances and water resistivities, as described above. Alternatively, the monitor 42 may be located away from the wellsite and the wellsite measurement system 70 may store and transmit the data collected at the wellsite to the monitor 42. For example, the monitor 42 may be located in a vehicle in the area of the wellsite or in facility remote from the wellsite. The wire 50 of the monitor 42 may be connected to a sonde or sensor 72 inserted into a well 74. The sonde 72 may be lowered adjacent to a borehole or formation 76 of the well 74. One or more sensors 78 may be connected to the sonde 72 and used to contact the borehole 76. Thus, the sensors 78 may provide capacitance values of the formation 76 and the sonde 72 may transmit those measured capacitance values to the monitor 42. In addition, the sonde 72 may be lowered throughout the length of the well 74 to provide a plurality of capacitance readings of the borehole 76. Based on the measured capacitances values, the circuitry disposed in the monitor 42 may be used to determine and display the formation water resistivity values of the formation 76 on the display 44. The formation water resistivity values may also be provided in a physical report. If the monitor 42 is located at the wellsite, the operators may be able to view the formation water resistivity values of the formation 76 without having to send subsurface samples 52 offsite to be analyzed. Alternatively, data from the sonde 72 may be transmitted to the monitor 42 located away from the wellsite, the formation water resistivity values determined by the monitor 42, and the values transmitted from the monitor 42 to the operators in the field. Thus, the formation water resistivities of the well 74 may be determined directly by obtaining the capacitances values using the sonde 72. Further, the operators may be able to make quicker decisions regarding drilling additional wells 74 or directing hydrocarbon production.

Certain embodiments of the measurement systems 40 and 70 may include computer-implemented processes and apparatuses for practicing those processes. For example, some embodiments may include a computer program product having computer program code containing executable instructions embodied in non-transitory tangible, machine-readable media, such as floppy diskettes, CD-ROMs, hard drives, USB (universal serial bus) drives, or any other tangible computer readable storage medium, wherein, when the computer program code is loaded into and executed by a computer, the computer becomes an apparatus for practicing embodiments of present techniques. Certain embodiments may include computer program code, for example, whether stored in a storage medium or loaded into and/or executed by a computer, wherein when the computer program code is stored in and executed by a computer, the computer becomes an apparatus for practicing embodiments of present techniques. When implemented on a general-purpose processor, the computer program code segments configure the processor to create specific logic circuits. Specifically, the measurement systems 40 and 70 may include computer code disposed on a non-transitory computer-readable storage medium or a process controller that includes such a non-transitory computer-readable storage medium. The computer code may include instructions for the measurement systems 40 and 70 to execute one or more procedures stored in circuitry of the monitor 42. These procedures may correspond to steps associated with the process 90 for determining formation water resistivity or conductivity, or the process 110 for developing a correlation between formation water resistivities, conductivities, and salinity indices.

While the disclosure may be susceptible to various modifications and alternative forms, specific embodiments have been shown by way of example in the drawings and have been described in detail herein. However, it should be understood that the embodiments provided herein are not intended to be limited to the particular forms disclosed. Rather, the various embodiments may cover all modifications, equivalents, and alternatives falling within the spirit and scope of the disclosure as defined by the following appended claims.

What is claimed is:

1. A method comprising:
   measuring a first capacitance of a subsurface sample at a first frequency using a measurement system;
   measuring a second capacitance of the subsurface sample at a second frequency using the measurement system;
   calculating a ratio of the first capacitance to the second capacitance using the measurement system; and
   determining a formation water resistivity or conductivity of formation water disposed in pore spaces of the subsurface sample using the ratio and the measurement system.

2. The method of claim 1, wherein determining comprises correlating a relationship between ratios of capacitances of known subsurface samples and water resistivities or conductivities of the known subsurface samples.

3. The method of claim 2, comprising:
   measuring water resistivities or conductivities of a plurality of known subsurface samples using the measurement system;
   measuring capacitances of the plurality of known subsurface samples at two or more frequencies using the measurement system;
   calculating ratios of the capacitances of the plurality of known subsurface samples; and
   correlating the ratios to the water resistivities or conductivities.

4. The method of claim 3, wherein correlating is determined based at least in part by performing a regression analysis of the water resistivities or conductivities of the plurality of known subsurface samples and the ratios of the capacitances of the plurality of known subsurface samples.

5. The method of claim 2, wherein correlating comprises generating an equation, a table of values, or a curve plotted on a graph, or a combination thereof.

6. The method of claim 1, wherein a frequency ratio of the first frequency to the second frequency is between approximately 0.3:1 to 0.7:1.

7. The method of claim 1, comprising estimating a gas saturation, oil saturation, or water saturation of the subsurface sample based at least in part on the determined formation water resistivity or conductivity.

8. The method of claim 1, comprising generating a report presenting at least the determined formation water resistivity or conductivity of the subsurface sample.

9. The method of claim 1, comprising:
   obtaining the subsurface sample from a hydrocarbon formation; and
   producing hydrocarbons from the hydrocarbon formation based at least in part on the determined formation water resistivity or conductivity of the subsurface sample.

10. The method of claim 9, wherein producing hydrocarbons from the hydrocarbon formation comprises:
    recovering hydrocarbons from the hydrocarbon deposit; and
    processing the recovered hydrocarbons.

11. A system comprising:
    a measurement system configured to sense capacitances of a subsurface sample at two or more frequencies, determine a ratio of the capacitances, and determine a formation water resistivity or conductivity of formation water disposed in pore spaces of the subsurface sample using the ratio of capacitances.

12. The system of claim 11, wherein the formation water resistivity or conductivity of the subsurface sample is determined based on a correlation between ratios of capacitances of known subsurface samples and water resistivities or conductivities of the known subsurface samples.

13. The system of claim 11, wherein the measurement system is configured to generate a report presenting at least the determined formation water resistivity or conductivity of the subsurface sample.

14. The system of claim 11, wherein the measurement system is configured to operate at least partially automatically.

15. The system of claim 11, wherein the measurement system comprises a computing device configured to determine the formation water resistivity or conductivity of the subsurface sample and a display device configured to display the formation water resistivity or conductivity of the subsurface sample.

16. A system comprising:
    a sensor configured to be inserted into a well and configured to sense capacitances of a formation of the well at two or more frequencies; and
    a measurement system configured to receive the capacitances from the sensor, determine a ratio of the capacitances, and determine a formation water resistivity or conductivity of formation water disposed in pore spaces of the formation of the well using the ratio of capacitances.

17. The system of claim 16, wherein the formation water resistivity or conductivity of the formation of the well is determined based on a correlation between ratios of capacitances of known subsurface samples and water resistivities or conductivities of the known subsurface samples.

18. The system of claim 16, wherein the sensor is coupled to the measurement system, and the measurement system is configured to determine the formation water resistivity or conductivity while adjacent to the well.

19. The method of claim 1, comprising determining the formation water resistivity or conductivity of formation water disposed in the pore spaces of the subsurface sample without removing the formation water from the subsurface sample.

20. The system of claim 16, wherein the formation water resistivity or conductivity comprises a complex formation water resistivity or conductivity.

* * * * *